UNITED STATES PATENT OFFICE.

FRANKLIN S. RANDALL, OF PHILADELPHIA, PENNSYLVANIA, ASSIGNOR, BY DIRECT AND MESNE ASSIGNMENTS, OF TWO-THIRDS TO FRANKLIN S. GIBSON AND THEODORE C. AVIS, BOTH OF SAME PLACE.

COMPOSITION FOR MAKING ARTICLES OF COMMERCE AND ART.

SPECIFICATION forming part of Letters Patent No. 397,612, dated February 12, 1889.

Application filed August 9, 1888. Serial No. 282,345. (No specimens.)

*To all whom it may concern:*

Be it known that I, FRANKLIN S. RANDALL, a citizen of the United States, and a resident of Philadelphia, Pennsylvania, have invented a new and Improved Composition for Making Articles of Commerce and Art, of which the following is a full and exact description.

The nature of my invention will fully appear from the following specification and claims. Its object is to produce a composition which may be molded or shaped into doorknobs, ornamental designs in imitation of wood-carving, inkstands, cane-heads and umbrella-handles, and articles generally for which hard rubber may be used.

My composition is made up of the following substances, viz: sawdust, asbestus, alum, dextrine, glue, and acetic acid.

The composition is composed of, say, sixteen parts, by weight. I mix six parts of glue and one part of acetic acid and melt and mix them thoroughly, applying heat. In another vessel I mix two parts of sawdust, four parts of asbestus, one part of alum, and two parts of dextrine. Into this vessel I pour the hot melted compound of glue and acetic acid. I then thoroughly stir and mix the mass together until the parts are well commingled. If it is then desired to mold, say, a canehead, sufficient of the composition is detached to fill the mold, into which it is forced so as to fill all the inside thereof, for its plastic nature will permit this. After being shaped it is removed from the mold, and is then kiln-dried or baked until it has acquired the hardness desirable for the purpose to which it is to be applied. The proportions named may be somewhat varied, but should approximate those named, as I have found them the best.

What I claim as new is—

1. A composition formed of the intermixture of two parts of sawdust, four parts asbestus, one part alum, two parts dextrine, and six parts of glue mixed with one part of acetic acid.

2. A composition formed of the intermixture of sawdust, asbestus, alum, dextrine, and glue and acetic acid, substantially as and for the purposes described.

In witness that the above is my invention I have hereunto set my hand.

FRANKLIN S. RANDALL.

Witnesses:
F. S. GIBSON,
H. V. BUCKLEY.